United States Patent
Nagashima et al.

(10) Patent No.: US 6,194,524 B1
(45) Date of Patent: *Feb. 27, 2001

(54) THERMOPLASTIC RESIN COMPOSITION

(75) Inventors: Tohru Nagashima; Hideo Nomura, both of Ibaraki (JP)

(73) Assignee: Sumitomo Chemical Company, Limited, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/843,646

(22) Filed: Apr. 10, 1997

(30) Foreign Application Priority Data

Apr. 11, 1996 (JP) .................................................. 8-089624

(51) Int. Cl.⁷ ............................. C08L 67/02; C08G 63/02
(52) U.S. Cl. ......................... 525/444; 525/437; 524/604; 528/272
(58) Field of Search .................................... 525/437, 444; 524/604; 528/272

(56) References Cited

U.S. PATENT DOCUMENTS

| 4,286,075 | 8/1981 | Robeson et al. . | |
|---|---|---|---|
| 5,143,985 | * 9/1992 | Robeson et al. | 525/437 |
| 5,236,988 | * 8/1993 | Doyama et al. | 525/437 |
| 5,352,746 | * 10/1994 | Asai et al. | 525/444 |
| 5,393,848 | * 2/1995 | Charbonneau et al. | 525/437 |
| 5,492,946 | 2/1996 | Huspeni et al. . | |
| 5,681,888 | * 10/1997 | Nomura et al. | 524/496 |
| 5,981,007 | * 11/1999 | Rubin et al. | 525/444 |

FOREIGN PATENT DOCUMENTS

| 361469 | 4/1990 | (EP) . |
| 374716 | 6/1990 | (EP) . |

* cited by examiner

*Primary Examiner*—Tae Yoon
(74) *Attorney, Agent, or Firm*—Birch, Stewart, Kolasch & Birch LLP

(57) ABSTRACT

A thermoplastic resin composition comprising 100 parts by weight of two or more thermoplastic resins and 0.1 to 100 parts by weight of a polyester having the specific structure, the polyester being added to the thermoplastic resins, wherein a glass transition temperature is not less than 50° C. and/or a deflection temperature under load is not less than 70° C. The present invention provides a high heat-resistant thermoplastic resin composition which is superior in mechanical physical properties and stress crack resistance.

9 Claims, No Drawings

THERMOPLASTIC RESIN COMPOSITION

BACKGROUND OF THE INVENTION

1. Field of the Invention

The present invention relates to a high heat-resistant thermoplastic resin composition which is superior in mechanical physical properties and stress crack resistance.

2. Description of the Related Art

Engineering plastics represented by polyamide, polyacetal and polyphenylene oxide resins and modifications thereof, polybutylene terephthalate resin, etc. are superior in heat resistance and strength to general-purpose resins such as polyethylene, polypropylene, polyvinyl chloride, ABS and the like. Therefore, they are widely used for applications such as automobile parts, electrical appliances, OA equipment, precision instruments, electric/electronic parts and the like.

However, most of the performance characteristics required for the various above applications can not be achieved by a single resin material. Therefore, in order to obtain a molding material which simultaneously satisfies physical properties which are contrary to each other (e.g. high impact properties and high rigidity), there is widely known a technique of blending or polymer-alloying different kinds of resins to obtain the desired physical properties.

In general, different kinds of resins are sometimes incompatible each other and, therefore, both resins form a crude phase separation structure wherein a sea/island structure is disordered in case of simply melt-kneading and the desired physical properties are sometimes not attained. Therefore, a compatibilizing agent is used for accomplishing fine dispersion of a resin component which converts into an island phase.

This compatibilizing agent is a compound or high-molecular weight material having affinity for two or more kinds of resins to be compatibilized or having a function of reacting chemically with them, and stabilizes an interface between different kinds of resins and contributes to fine dispersion of the island phase.

For example, Japanese Patent Kokai (Laid-Open) No. 56-26913 discloses that, by mixing a compound having a polar group such as carboxylic group, acid anhydride group, etc. where a polymer alloy of a polyphenylene oxide resin and polyamide is produced, a composition is obtained whose impact resistance and solvent resistance are extremely improved while the heat resistance of the polyphenylene oxide is maintained.

Japanese Patent Kokai (Laid-Open) No. 61-120855 discloses that the impact resistance and tensile elongation are extremely improved by adding a silane derivative to a polymer alloy prepared by formulating a rubber to a polyphenylene oxide resin and polyamide.

Japanese Patent Kokai (Laid-Open) No. 56-115355 discloses that a composition whose impact resistance is extremely improved is obtained by formulating a styrene-butadiene block copolymer modified with maleic anhydride to one or more engineering plastics such as polyacetal, polycarbonate and the like.

Japanese Patent Kokai (Laid-Open) No. 59-58052 discloses that the bending strength, impact resistance and hydrolysis resistance are improved by formulating an epoxy resin to a polymer alloy of a polyphenylene sulfide resin and a thermoplastic polyester resin.

In application where heat resistance is required, polymer-alloying due to combinations having high heat resistance is required. Therefore, polymer-alloying due to comparatively high heat-resistant resins, for example, polyphenylene sulfide resin and polyarylate, polysulfone, polyphenylene oxide resin, polyether ketone, thermoplastic polyimide, etc. is studied in Japanese Patent Kokai (Laid-Open) No. 59-164360. This publication discloses that the bending strength and impact resistance of a composition prepared by formulating an epoxy resin in the case of producing the polymer alloy are extremely improved in comparison with a composition prepared by formulating no epoxy resin.

However, a processing temperature exceeding 300° C. is sometimes required when a polymer alloy containing such a high heat-resistant resin as a component is produced and the resulting polymer alloy composition is molded. Therefore, compounds or high-molecular weight materials formulated as the compatibilizing agent cause heat deterioration during the production of the polymer alloy or at the time of molding the resulting composition, thereby causing problems such as inhibition of a function as the compatibilizing agent, deterioration of physical properties of the composition, etc.

SUMMARY OF THE INVENTION

An object of the present invention is to provide a thermoplastic resin composition having high strength, high heat resistance and excellent stress crack resistance, which can be suitably used for applications such as parts for automobile, aircraft, etc., industrial equipment, electrical appliances, OA equipment, electric/electronic parts, etc.

The present inventors have intensively studied to solve the above problems. As a result, the above object is accomplished by adding 1 to 100 parts by weight of a polyester having a specific structure in the case of producing a polymer alloy of a high heat-resistant thermoplastic resin. Thus, the present invention has been completed.

That is, the present invention is as follows.

(1) A thermoplastic resin composition comprising 100 parts by weight of two or more thermoplastic resins and 0.1 to 100 parts by weight of a polyester having the following structure, the polyester being added to the thermoplastic resins, wherein a glass transition temperature determined by using DSC (differential scanning calorimeter) is not less than 50° C. and/or a deflection temperature under load (load: 1.82 MPa) is not less than 70° C.:

polyester composed of a repeating unit represented by the formulas:

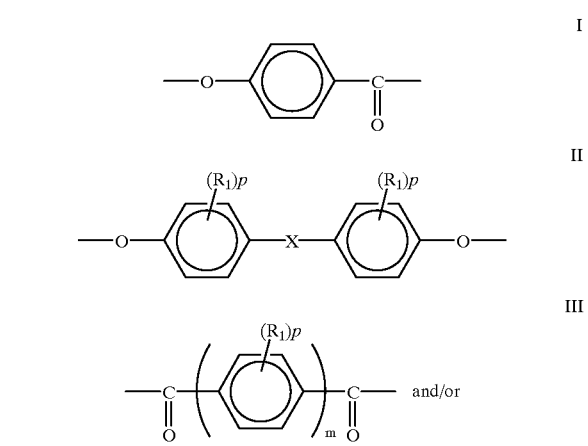

-continued

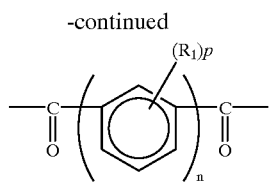

(wherein X is one or more selected from —SO$_2$—, —CO—, —O—, —S—, —CH$_2$—, —CH$_2$—CH$_2$—, —C(CH$_3$)$_2$— and single bond; R$_1$ represents an alkyl group having 1 to 6 carbon atoms, an alkenyl group having 3 to 10 carbon atoms, a phenyl group or a halogen atom; p represents an integer of 0 to 4; m and n represent an integer of 1 to 4; and a plurality of R$_1$ on the same or different nuclei may be different each other and each p may be different each other), which satisfies the following expressions:

$$0 \leq (I) \leq 95 \text{ (mol \%)}, (II)+(III)=100-(I) \text{ (mol \%)},$$

$$0.9 \leq (II)/(III) \leq 1.1.$$

(2) The thermoplastic resin composition according to the term (1), wherein X is —SO$_2$— and/or —C(CH$_3$)$_2$— in the repeating unit II of the polyester.

(3) The thermoplastic resin composition according to the term (1) or (2), wherein the deflection temperature under load of at least one thermoplastic resin is not less than 150° C.

(4) The thermoplastic resin composition according to the term (1) or (2), wherein at least one thermoplastic resin is polyarylate, liquid crystal polyester, polysulfone, polyethersulfone, polyether ether ketone or polyether imide.

(5) The thermoplastic resin composition according to the term (1) or (2), wherein at least one thermoplastic resin is a liquid crystal polyester.

(6) The thermoplastic resin composition according to the term (1) or (2), wherein the liquid crystal polyester contains at least 30 mol % of a repeating unit represented by the formula I.

DETAILED DESCRIPTION OF THE INVENTION

Regarding the thermoplastic resin used in the present invention, the glass transition temperature measured by using DSC according to ASTM D3418 is not less than 50° C. and/or a deflection temperature under load (load: 1.82 MPa) measured according to ASTM D648 is not less than 70° C. When using the thermoplastic resin having the glass transition temperature of less than 50° C. or deflection temperature under load of less than 70° C., the desired high heat-resistant engineering plastic material of the present invention is not obtained, and it is not preferred.

Examples of the thermoplastic resin include polyacetal, polyamide 66, polyamide 610, polyamide 612, polyamide 46, polyamide 6T, polyamide MXD6, polyethylene terephthalate, polybutylene terephthalate, polyethylene naphthalate, polybutylene naphthalate, polycyclohexyl terephthalate, polyarylate, liquid crystal polyester, liquid crystal polyester amide, polycarbonate, polyphenylene oxide and modification thereof, polyphenylene sulfide, polysulfone, polyethersulfone, polyketone, polyether ketone, polyether nitrile, thermoplastic polyimide, polyether imide, polyamide-imide and the like. Among them, polyamide 46, polyamide 6T, polyamide MXD6, polyarylate, liquid crystal polyester, liquid crystal polyester amide, polyphenylene sulfide, polysulfone, polyethersulfone, polyether ketone, polyether ether ketone, polyether nitrile, thermoplastic polyimide, polyether imide and polyamide-imide are preferred.

Regarding at least one thermoplastic resin, it is more preferred that the deflection temperature under load is not less than 150° C.

Examples of the thermoplastic resin include polyamide 46, polyarylate, liquid crystal polyester, liquid crystal polyester amide, polysulfone, polyethersulfone, polyether ketone, polyether ether ketone, polyether nitrile, thermoplastic polyimide, polyether imide, polyamideimide and the like. Among them, polyarylate, liquid crystal polyester, polysulfone, polyethersulfone, polyether ether ketone, polyether nitrile and polyether imide are more preferred.

Thermoplastic resins used in combination in this invention, are not miscible each other by melt-kneading. The combinations of such thermoplastic resins include, polysulfone and liquid crystal polyester, polyether ketone and liquid crystal polyester, polyether imide and liquid crystal polyester, polyethersulfone and liquid crystal polyester, polyethersulfone and polycarbonate, polycarbonate and liquid crystal polyester, polyphenylene oxide and polyamide 6, polyphenylene sulfide and liquid crystal polyester, polyphenylene sulfide and liquid crystal polyester, etc. Among them, the combinations of polyethersulfone and liquid crystal polyester, polyether ether ketone and liquid crystal polyester, polyether imide and liquid crystal polyester, polyphenylene sulfide and liquid crystal polyester are preferable.

In the combination of thermoplastic resins, the amount of the one thermoplastic resin is preferably from 1 to 99 parts by weight based on 100 parts by weight of the total amount of the combined thermoplastic resins. More preferably, the amount of the one thermoplastic resin is from 10 to 90 parts by weight. As the one thermoplastic resin, a liquid crystal polyester is used preferably in amount of from 10 to 40 parts by weight.

On the other hand, a combination of thermoplastic resins which are miscible uniformly by melt-kneading, does not form a finely dispersed structure of a dispersed phase, and it is not preferred. As such combination, polyetherimide and polycarbonate, polyether ether ketone and polyetherimide, polybutylene terephthalate and polycarbonate, polyethylene terephthalate and polycarbonate, etc. are known.

The polyester having a specific structure used in the present invention is composed of the above repeating units I, II and III, and satisfies the above numeral expressions. Regarding those wherein the proportion of the unit (I) exceeds 95 mol %, the proportion of a non-fusible crystalline moiety is large and it becomes impossible to disperse the polyester and thermoplastic resin in the production of the composition. Therefore, it is not preferred. Regarding those which satisfies the following expression:

$$(II)/(III)<0.9 \text{ or } (II)/(III)>1.1,$$

a sufficient high-molecular weight material is not obtained at the time of producing the polyester. Therefore, it is not preferred.

It is preferred that X is —SO$_2$ and/or —C(CH$_3$)$_2$—. It is more preferred that the repeating unit I satisfies the following expression:

$$0 \leq (I) \leq 80 \text{ (mol \%)}.$$

Examples of the method for producing the polyester having a specific structure used in the present invention include polymerizing a bisphenol component dissolved in an aqueous alkaline solution with terephtaloyl dichloride and/or isophtaloyl dichloride and parahydroxybenzoyl chloride dissolved in an organic solvent such as halogenated hydrocarbon in the presence of a catalyst, polymerizing an acetylated bisphenol component with parahydroxybenzoic acid and terephthalic acid and/or isophthalic acid with eliminating acetic acid at high temperature, polymerizing a bisphenol component with phenyl parahydroxybenzoate and a phenyl ester of terephthalic acid and/or isophthalic acid with eliminating phenol at high temperature, subjecting the polyester thus obtained to solid-phase polymerization and the like, but are not limited thereto.

Regarding the polyester having a specific structure used in the present invention, the flow temperature is preferably from 150 to 450° C., more preferably from 280 to 400° C. The "flow temperature" used herein means a temperature where a melt viscosity indicates 48000 poise when a resin heated at a heating rate of 4° C./minute is extruded from a nozzle having an inner diameter of 1 mm and a length of 10 mm under a load of 100 kg/cm$^2$ using a Koka type flow tester, model CFT-500 manufactured by Shimadzu Corporation Co. , Ltd. In the case of formulating those whose flow temperature is lower than 150° C., heat deterioration arises in the production of the composition or at the time of molding the resulting composition because the molecular weight of the polyester is low. Therefore, it is not preferred. On the other hand, in case of formulating those whose flow temperature exceeds 450° C., it becomes impossible to disperse the polyester and thermoplastic resin in the production of the composition because the melt viscosity of the polyester is high. Therefore, it is not preferred.

An amount of the polyester having a specific structure used in the present invention is preferably from 0.1 to 100 parts by weight, more preferably from 1 to 20 parts by weight, based on 100 parts by weight of two or more thermoplastic resins wherein a glass transition temperature is not less than 50° C. and/or a deflection temperature under load is not less than 70° C. When the amount is smaller than 0.1 parts by weight, the resin component converted into the island phase of the resulting composition is not finely dispersed and desired improvement in physical properties is not accomplished. On the other hand, even if the polyester is added in the amount of more than 100 parts by weight, physical properties are not further improved and the feature of the thermoplastic resin is largely damaged. Therefore, it is not preferred.

In the present invention, there can optionally be added one or more conventional additives such as fibrous or needle-like reinforcement (e.g. glass fiber, silica-alumina fiber, alumina fiber, carbon fiber, aluminum borate whisker, etc.), inorganic filer (e.g. talc, mica, clay, glass beads, etc.), fluororesin, release modifier (e.g. metallic soap, etc.), colorant (e.g. dye, pigment, etc.), antioxidant, heat stabilizer, ultraviolet absorber, anti-static agent, surfactant and the like.

It is also possible to add one or more types of a small amount of a thermoplastic resin wherein the glass transition temperature is lower than 50° C. or the deflection temperature under load is not less than 70° C., such as polyethylene, polypropylene, polyvinyl chloride, ABS resin, polystyrene, methacrylate resins, etc.; a small amount of a thermosetting resin such as phenol resin, epoxy resin, isocyanate resin, polyimide resin, etc.; and a small amount of a rubber component.

The means for formulating raw materials to obtain the resin composition of the present invention is not specifically limited. Generally used are two or more thermoplastic resins wherein a glass transition temperature is not less than 50° C. and/or a deflection temperature under load is not less than 70° C., a polyester composed of the above repeating units I, II and III and, if necessary, reinforcement such as glass fiber, inorganic fillers, release modifiers and heat stabilizers are mixed using a Henschel mixer or a tumbler, followed by melt-kneading using an extruder. In the case of melt-kneading, all raw materials may be fed to the extruder after mixing at once and, if necessary, raw materials such as reinforcement (e.g. glass fiber), inorganic fillers, etc. and raw materials composed mainly of resins may be separately fed.

EXAMPLES

The following Examples further illustrate the present invention in detail but are not to be construed to limit the scope thereof. Measurement of the tensile strength, yield elongation in tension, bending modulus and Izod impact value as well as evaluation of the stress crack resistance in the Examples were conducted in the following manner.
(1) Tensile strength, yield elongation:
An ASTM No. 4 dumbbell specimen was molded from a thermoplastic resin molding material, using an injection molder, and the tensile strength and yield elongation were measured according to ASTM D638.
(2) Bending modulus:
A specimen having a length of 127 mm, a width of 12.7 mm and a thickness of 6.4 mm was molded from a thermoplastic resin molding material, using an injection molder, and the bending modulus was measured according to ASTM D790.
(3) Izod impact value:
A specimen having a length of 63 mm, a width of 12.7 mm and a thickness of 6.4 mm was molded from a thermoplastic resin molding material, using an injection molder, and the Izod impact value was measured according to ASTM D256.
(4) Stress crack resistance:
A specimen having a length of 127 mm, a width of 12.7 mm and a thickness of 6.4 mm was molded from a thermoplastic resin molding material, using an injection mold. A constant stress was applied to this specimen due to three-point bending and, after applying a solvent to the center part of the specimen, the time to breakage was measured. The longer the time to breakage, the better the stress crack resistance is.

Reference Example 1

In a polymerization vessel equipped with an anchor-shaped stirring blade, parahydroxybenzoic acid, 4,4'-dihydroxydiphenyl sulfone and terephthalic acid were charged at a molar ratio of 60:20:20. Acetic anhydride was added in an amount of 1.1 equivalent to one equivalent of a hydroxyl group, followed by stirring with substituting the inside of the system with nitrogen for 10 minutes. Then, the acetylation reaction was conducted at the reaction temperature at 150° C. with stirring under a nitrogen atmosphere for 3 hours. The reaction product was heated to 320° C. at a heating rate of 1° C./min. with distilling off acetic acid formed as by-products, and then polycondensed at 320° C. for 15 minutes. The resulting polymer was removed from the polymerization vessel, cooled and ground using a grinder (Rotoplex R16/8, manufactured by Hosokawa Micron Co., Ltd.) to form particles having an average particle diameter of not more than 1 mm, which was then subjected to solid-phase polymerization at the treating temperature of 260° C. under a nitrogen atmosphere (normal pressure) for 4 hours to obtain a polyester 1.

The flow temperature of this polyester was 386° C.

Reference Example 2

A polymer obtained according to the same manner as that described in Reference Example 1 was removed from the polymerization vessel, cooled and ground using a grinder (Rotoplex R16/8, manufactured by Hosokawa Micron Co., Ltd.) to form particles having an average particle diameter of not more than 1 mm, which was then subjected to solid-phase polymerization at the treating temperature of 220° C. under a nitrogen atmosphere (normal pressure) for 4 hours to obtain a polyester 2.

The flow temperature of this polyester was 310° C.

Reference Example 3

According to the same manner as that described in Reference Example 1 except for charging parahydroxybenzoic acid, 4,4'-dihydroxydiphenyl sulfone, terephthalic acid and isophthalic acid were charged at a molar ratio of 20:40:30:10, a polymer was obtained. The resulting polymer was removed from the polymerization vessel, cooled and ground using a grinder (Rotoplex R16/8, manufactured by Hosokawa Micron Co., Ltd.) to form particles having an average particle diameter of not more than 1 mm, which was then subjected to solid-phase polymerization at the treating temperature of 220° C. under a nitrogen atmosphere (normal pressure) for 4 hours to obtain a polyester 3.

The flow temperature of this polyester was 315° C.

Examples 1 to 3

Comparative Example 1

80 Parts by weight of polyethersulfone (SUMIKAEXCEL PES 5200P, trade name of Sumitomo Chemical Co., Ltd.), 20 Parts by weight of a liquid crystal polyester (SUMIKASUPER LCP E4000, trade name of Sumitomo Chemical Co., Ltd.) and the polyester polymerized in Reference Example 1, as the thermoplastic resin, were mixed according to the composition shown in Table 1, using a Henschel mixer, and then granulated using a twin-screw extruder (PCM-30, manufactured by Ikegai Iron Works, Ltd.) at the cylinder temperature of 340° C. to obtain a thermoplastic resin composition (Examples 1 to 3), respectively. A glass transition temperature of the only SUMIKAEXCEL PES 5200P was 225° C. and a deflection temperature under load thereof was 215° C. A deflection temperature under load of the only SUMIKASUPER LCP E4000 was 335° C. According to the same manner, a thermoplastic resin composition (Comparative Example 1) containing no polyester polymerized in Reference Example 1 was obtained. As described above, a specimen was molded from the thermoplastic resin composition thus obtained at the cylinder temperature of 380° C. at the mold temperature of 150° C., using an injection molder (PS40E5ASE, manufactured by Nissei Plastic Industrial Co., Ltd.), and then measurement of the tensile strength, yield elongation in tension, bending modulus and Izod impact value as well as evaluation of the stress crack resistance, shown in Table 1, were conducted.

As is apparent from Table 1, the composition containing a polyester, which has a specific structure, of the present invention (Examples 1 to 3) is improved in tensile strength, yield elongation in tension, bending modulus and Izod impact value and is superior in stress crack resistance in comparison with the composition containing no polyester (Comparative Example 1).

TABLE 1

| | Unit | Example 1 | Example 2 | Example 3 | Comparative example 1 |
|---|---|---|---|---|---|
| Polyester 1 | Parts by weight | 1 | 5 | 10 | 0 |
| Tensile strength | kg/cm$^2$ | 1130 | 1520 | 1550 | 940 |
| Yield elongation | % | 5.0 | 7.4 | 8.4 | 4.4 |
| Bending modulus | kg/cm$^2$ | 53700 | 51600 | 50200 | 43700 |
| Izod impact value (no notch) | kgcm/cm | 39 | 50 | 62 | 19 |
| Stress crack resistance* | min | >20 | >20 | >20 | 8 |

*Solvent; methyl ethyl ketone, Stress; 500 kg/cm$^2$

Examples 4 to 7

Comparative Examples 2 to 5

A polyether ether ketone resin (VICTREX PEEK 450P, trade name of VICTREX Co.), a polyphenylene sulfide resin (TOHPREN T-4, trade name of TOHPREN Co.), a polyether imide resin (ULTEM 1000, manufactured by General Electric Co.), a polycarbonate resin (CARIBRE 200-3, manufactured by Sumitomo Dow Co., Ltd.), a liquid crystal polyester resin (SUMIKASUPER LCP E6000, trade name of Sumitomo Chemical Co., Ltd.) and the polyester polymerized in Reference Example 2 or 3, as the thermoplastic resin, were mixed according to the composition shown in Table 1, using a Henschel mixer, and then granulated using a twin-screw extruder (PCM-30, manufactured by Ikegai Iron Works, Ltd.) at the cylinder temperature of 330–350° C. to obtain a thermoplastic resin composition (Examples 4 to 7), respectively. A glass transition temperature of the simple polyether ether ketone resin was 143° C. and a deflection temperature under load thereof was 152° C. A deflection temperature under load of the only polyphenylene sulfide resin was 85° C. and a deflection temperature under load thereof was 105° C. A glass transition temperature of a simple substance polyether imide resin was 217° C. and a deflection temperature under load thereof was 200° C. A glass transition temperature of the only polycarbonate resin was 145° C. and a deflection temperature under load thereof was 141° C. A deflection temperature under load of the only liquid crystal polyester resin (SUMIKASUPER LCP E6000) was 230° C. According to the same manner, a thermoplastic resin composition (Comparative Examples 2 to 5) containing no polyester polymerized in the Reference Example was obtained. As described above, a specimen was molded from the thermoplastic resin composition thus obtained at the cylinder temperature of 330–380° C. at the mold temperature of 120–180° C., using an injection molder (PS40E5ASE, manufactured by Nissei Plastic Industrial Co., Ltd.), and then measurement of the tensile strength, yield elongation in tension, bending modulus and Izod impact value as well as evaluation of the stress crack resistance, shown in Table 1, were conducted.

As is apparent from Table 2, the composition containing a polyester, which has a specific structure, of the present invention (Examples 4 to 7) is improved in mechanical physical properties such as tensile strength, yield elongation in tension, bending modulus and Izod impact value in comparison with the composition containing no polyester (Comparative Examples 2 to 5).

TABLE 2

| | Unit | Example 4 | Comparative example 2 | Example 5 | Comparative example 3 | Example 6 | Comparative example 4 | Example 7 | Comparative example 5 |
|---|---|---|---|---|---|---|---|---|---|
| Polyether ether ketone resin | Parts by weight | 70 | 70 | — | — | — | — | — | — |
| Polyphenylene sulfide resin | Parts by weight | — | — | 80 | 80 | — | — | — | — |
| polyetherimide resin | Parts by weight | — | — | — | — | 80 | 80 | — | — |
| Polycarbonate resin | Parts by weight | — | — | — | — | — | — | 80 | 80 |
| Liquid crystal polyester resin | Parts by weight | 30 | 30 | 20 | 20 | 20 | 20 | 20 | 20 |
| Polyester 2 | Parts by weight | 5 | — | — | — | 5 | — | — | — |
| Polyester 3 | Parts by weight | — | — | 5 | — | — | — | 5 | — |
| Tensile strength | kg/cm$^2$ | 1710 | 1480 | 1100 | 800 | 1530 | 1140 | 1030 | 910 |
| Yield elongation | % | 5.8 | 5.6 | 5.6 | 4.0 | 7.9 | 6.0 | 9.1 | 7.2 |
| Bending modulus | kg/cm$^2$ | 70900 | 57100 | 36900 | 36200 | 53800 | 49600 | 30300 | 29500 |
| Izod impact value (no notch) | kgcm/cm | 40 | 33 | 21 | 9 | 43 | 39 | 90 | 31 |

Examples 8, 9

Comparative Examples 6, 7

A polyethersulfone resin (SUMIKAEXCEL PES 3600P, trade name of Sumitomo Chemical Co., Ltd.), a liquid crystal polyester resin (SUMIKASUPER LCP E6000, trade name of Sumitomo Chemical Co., Ltd.) and the polyester polymerized in Reference Example 2 or 3, as the thermoplastic resin, and a glass fiber (CS03JPX1, manufactured by Asahi Fine Glass Co., Ltd.) were mixed according to the composition shown in Table 1, using a Henschel mixer, and then granulated using a twin-screw extruder (PCM-30, manufactured by Ikegai Iron Works, Ltd.) at the cylinder temperature of 340° C. to obtain a thermoplastic resin composition (Examples 8, 9), respectively. A glass transition temperature of the only SUMIKAEXCEL PES 3600 was 225° C. and a deflection temperature under load thereof was 215° C. According to the same manner, a thermoplastic resin composition (Comparative Examples 6,7) containing no polyester polymerized in the Reference Example was obtained. As described above, a specimen was molded from the thermoplastic resin composition thus obtained at the cylinder temperature of 350° C. at the mold temperature of 150° C., using an injection molder (PS40E5ASE, manufactured by Nissei Plastic Industrial Co., Ltd.), and then measurement of the tensile strength, yield elongation in tension, bending modulus and Izod impact value as well as evaluation of the stress crack resistance, shown in Table 1, were conducted.

As is apparent from Table 3, the composition containing a polyester, which has a specific structure, of the present invention (Examples 8, 9) is improved in mechanical physical properties such as tensile strength, yield elongation in tension, bending modulus and Izod impact value in comparison with the composition containing no polyester (Comparative Examples 6, 7).

TABLE 3

| | Unit | Example 8 | Comparative example 6 | Example 9 | Comparative example 7 |
|---|---|---|---|---|---|
| Polyether sulfone resin | Parts by weight | 80 | 80 | 80 | 80 |
| Liquid crystal polyester resin | Parts by weight | 20 | 20 | 20 | 20 |
| Polyester 2 | Parts by weight | 5 | — | 5 | — |
| Glass fiber | Parts by weight | — | — | 43 | 43 |
| Tensile strength | kg/cm$^2$ | 1500 | 1270 | 1610 | 1300 |
| Yield elongation | % | 6.5 | 6.4 | 4.4 | 3.7 |
| Bending modulus | kg/cm$^2$ | 49700 | 42700 | 108900 | 110000 |
| Izod impact value (no notch) | kgcm/cm | 24 | 30 | 34 | 29 |

The thermoplastic resin composition of the present invention has high strength, high heat resistance and excellent stress crack resistance, and is extremely useful for applications such as parts for automobile, aircraft, etc., industrial equipment, electrical appliances, OA equipment, electric/electronic parts, etc.

What is claimed is:

1. A thermoplastic resin composition comprising 100 parts by weight of two or more thermoplastic resins and 1 to 20 parts of a polyester having the following structure, the polyester being added to the thermoplastic resins, wherein a glass transition temperature of said thermoplastic resins determined by using DSC (differential scanning calorimeter) is not less than 50° C. and/or deflection temperature under load of said thermoplastic resins is not less than 70° C., and at least one of the thermoplastic resins is a liquid crystal polyester and another one is a thermoplastic resin selected from the group consisting of polycarbonate, polysulfon, polyethersulfone, polyether ether ketone, polyether imide and polyphenylene sulfide; wherein said polyester is composed of a repeating unit represented by the formulae:

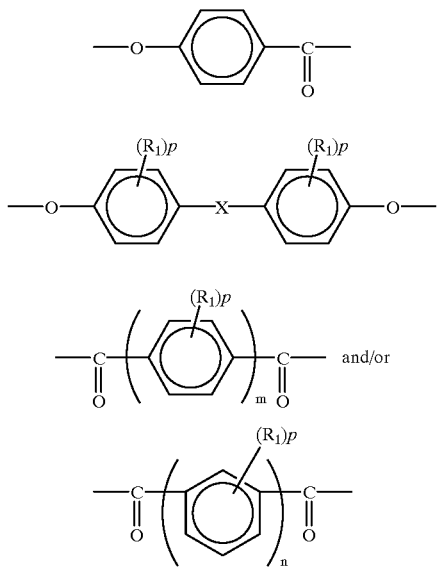

wherein X is —$SO_2$—; $R_1$ represents an alkyl group having 1–6 carbon atoms, an alkenyl group having 3 to 10 carbon atoms, a phenyl group or a halogen atom; p represents an integer of 0 to 4; m and n represent an integer of 1 to 4; and a plurality of $R_1$ on the same or different nuclei may be different from each other and each p is different from each other, which satisfies the following expressions:

0≤(I)≤95 (mol %), (II)+(III)=100−(I) (mol %), 0.9≤(II)/(III)≤1.1.

2. The thermoplastic resin composition according to claim 1, wherein the deflection temperature under load of at least one thermoplastic resin is not less than 150° C.

3. The thermoplastic resin composition according to claim 1, wherein the liquid crystalline polyester contains at least 30 mol % of a repeating unit represented by the formula I.

4. A thermoplastic resin composition of claim 1, wherein said liquid crystal polyester is present in an amount of from 10 to 40 parts by weight.

5. A thermoplastic resin composition of claim 1, wherein repeating unit I satisfies the following expression:

0≤(I)≤80 (mol %).

6. A thermoplastic resin composition of claim 1, wherein the flow temperature of said polyester is from 280 to 400° C.

7. The thermoplastic resin composition according to claim 1 wherein one of the two thermoplastic resins is from 1 to 99 parts by weight of the total amount of the combined thermoplastic resins.

8. The thermoplastic resin composition according to claim 1 wherein the thermoplastic resin is selected from the group consisting of polycarbonate, polysulfon, polyethersulfone, polyether imide and polyphenylene sulfide.

9. A thermoplastic resin composition comprising 100 parts by weight of two thermoplastic resins and 0.1 to 100 parts of a polyester having the following structure, the polyester being added to the thermoplastic resins, wherein a glass transition temperature of said thermoplastic resins determined by using DSC (differential scanning calorimeter) is not less than 50° C. and/or deflection temperature under load of said thermoplastic resins is not less than 70° C., and one of the thermoplastic resins is a liquid crystal polyester and the other is a thermoplastic resin selected from the group consisting of polycarbonate, polysulfon, polyethersulfone, polyether ether ketone, polyether imide and polyphenylene sulfide; wherein said polyester is composed of a repeating unit represented by the formulae:

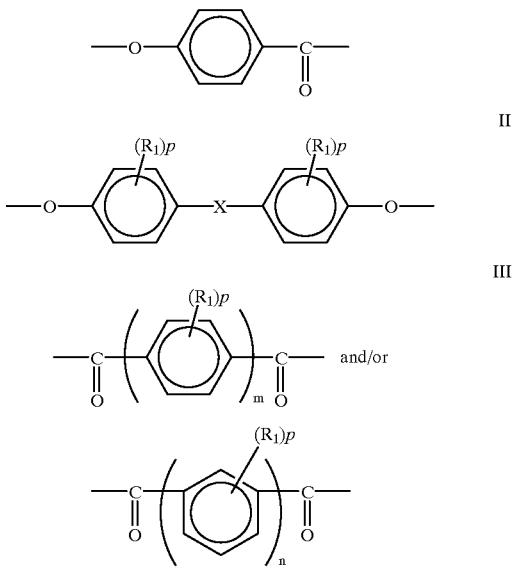

wherein X is —$SO_2$—; $R_1$ represents an alkyl group having 1–6 carbon atoms, an alkenyl group having 3 to 10 carbon atoms, a phenyl group or a halogen atom; p represents an integer of 0 to 4; m and n represent an integer of 1 to 4; and a plurality of $R_1$ on the same or different nuclei may be different from each other and each p is different from each other, which satisfies the following expressions:

0≤(I)≤95 (mol % ), (II)+(III)=100−(I) (mol %), 0.9≤(II)/(III)≤1.1.

* * * * *